United States Patent

Florus et al.

[15] 3,683,283
[45] Aug. 8, 1972

[54] ROTARY ACCELERATION INDICATOR, ESPECIALLY FOR MOTOR VEHICLES

[72] Inventors: Hans-Jörg Florus, Göppingen; Horst Grossner, Geradstetten, both of Germany

[73] Assignee: Daimler-Benz Aktiengesellschaft, Stuttgart-Unterturkheim, Germany

[22] Filed: Feb. 13, 1970

[21] Appl. No.: 11,153

[30] Foreign Application Priority Data

Feb. 14, 1969 Germany..........P 19 07 392.8

[52] U.S. Cl.....................328/5, 307/275, 303/21 C, 340/262
[51] Int. Cl..............................................G01n 27/00
[58] Field of Search.............340/262; 328/5; 73/517; 303/21 C, 21 CE, 21 CG; 181/181 A; 324/162; 307/308, 275

[56] References Cited

UNITED STATES PATENTS

| | | |
|---|---|---|
| 2,039,701 | 5/1936 | Bush......................303/21 CE |
| 2,178,290 | 10/1939 | Sorensen...............303/21 CE |
| 2,753,475 | 7/1956 | Curl............................73/517 |
| 2,940,038 | 6/1960 | Probert......................324/162 |
| 3,233,946 | 2/1966 | Lockhart...................340/262 |

FOREIGN PATENTS OR APPLICATIONS

| | | |
|---|---|---|
| 165,835 | 1/1959 | Sweden......................324/162 |
| 1,017,389 | 10/1957 | Germany..................264/1 AR |

*Primary Examiner*—Stanley D. Miller, Jr.
*Assistant Examiner*—Harold A. Dixon
*Attorney*—Craig, Antonelli and Hill

[57] ABSTRACT

A pulse transmitter which responds upon exceeding a predetermined rotary acceleration, especially for motor vehicles in which a rotating mass is coupled by way of a spring with the rotating system whereby the rotation of the rotating mass with respect to the rotating system serves as measurement for the rotary acceleration; a shifting device, associated with the rotating mass, is connected with the secondary winding arranged in the rotating part of a contactless transmitter whose primary winding is arranged in the fixed part and is connected with a transistorized high-frequency generator for producing a signal.

23 Claims, 4 Drawing Figures

PATENTED AUG 8 1972　　3,683,283

INVENTORS
HANS-JÖRG FLORUS
HORST GROSSNER

BY *Craig, Antonelli, Stewart & Hill*
ATTORNEYS

ROTARY ACCELERATION INDICATOR, ESPECIALLY FOR MOTOR VEHICLES

The present invention relates to a pulse transmitter responding to an exceeding of a predetermined rotary acceleration, especially for motor vehicles, whereby a rotating mass is coupled with the rotating system by way of a spring whose rotation with respect to the rotating part serves as measurement for the rotary acceleration or spinning.

Rotary acceleration indicators or rotary acceleration measuring devices are generally constructed in the aforementioned manner. Above the natural frequency of the spring-mass system, the deflections of the rotating mass with respect to the part of the transmitter rotating along are proportional to the rotary acceleration. These deflections are transmitted to the outside and one thus obtains a rotary acceleration transmitter. If, at a predetermined deflection, i.e., at a predetermined rotary acceleration, a switch is actuated, then this rotary acceleration measuring device represents a limit transmitter (or switch) for rotary accelerations.

Since the switch is located on the rotating part, an electric transmission to the fixed part is necessary. This is realized with the known arrangements generally by way of slip rings. However, these slip rings are very prone to disturbances and failures and are subjected to mechanical wear so that such prior art rotary acceleration transmitters or limit switches are not very reliable in operation. The present invention is predicated on the task to avoid the aforementioned disadvantages. It solves the underlying problems with the arrangements of the type described above in that a shifting member, possibly also a continuously operable shifting member is coordinated to the rotating mass, which is connected with the secondary winding arranged in the rotating part of a conventional contactless transmitter whose primary winding is arranged in the fixed part and is operatively connected with a conventional transistorized high-frequency generator for producing a signal.

According to the present invention, one obtains a purely electric, contactless transmission of the pulses produced in the rotating part to the fixed part. Consequently, the arrangement of the present invention is not subjected any longer to any mechanical wear, and it is therefore very reliable in operation because mechanical failures do not occur any longer.

In one type of construction of the present invention, a switch connected in the circuit of the secondary winding is arranged as shifting device in the rotating part whose contacts are adapted to be closed by an entrainment or follower member arranged on the rotating mass or operatively connected therewith.

In a preferred embodiment according to the present invention, a coil or winding connected in the circuit of the secondary winding is arranged as shifting device in the rotating part whose alternating current impedance is adapted to be influenced by a metallic plate arranged on the rotating mass or in operative connection therewith. The arrangement is thereby appropriately made in such a manner that the metal plate increases its distance from the coil or winding with a deflection of the rotating mass. One obtains the further advantage with this preferred embodiment that adjustments, for example, of the response sensitivity can be realized by electric corrections at the fixed part. An engagement into the rotating part is no longer necessary therefor so that it can be rigidly built-in.

Consequently, such a type of contactless rotary acceleration transmitter or indicator gains particular interest in conjunction with a so-called electronic brake-locking-prevention device for motor vehicles. These installations operate with rotary acceleration transmitters that are mounted on each wheel of a motor vehicle. It is determined by means of these transmitters whether the wheel still adheres to the road surface or whether it is locked. In the latter case, the brake of the respective wheel is then disengaged or released by corresponding pulses and is re-engaged only when the wheel has regained its ground adherence. Since the rotary acceleration transmitter proposed by the present invention is completely maintenance-free and is constructed without parts subjected to wear, it may be securely mounted at the wheels or axles and can continuously rotate in unison therewith.

Accordingly, it is an object of the present invention to provide a rotary acceleration transmitter which avoids the aforementioned shortcomings and drawbacks encountered in the prior art.

Another object of the present invention resides in a rotary acceleration transmitter, especially for motor vehicles, which is substantially maintenance-free, eliminates the presence of parts subjected to mechanical wear, and is extraordinarily reliable in operation.

A further object of the present invention resides in a rotary acceleration transmitter of the type described above which permits adjustments to be made in the fixed parts thereof so that the rotating parts can be permanently installed.

These and further objects, features, and advantages of the present invention will become more obvious from the following description when taken in connection with the accompanying drawing which shows, for purposes of illustration only, two embodiments in accordance with the present invention, and wherein.

Figure 1:
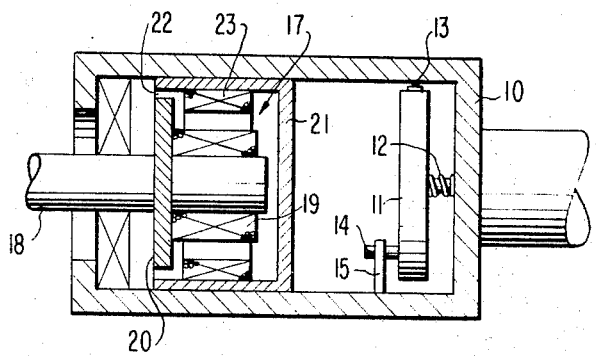
FIG. 1 is an axial cross-sectional view through a rotary acceleration transmitter in accordance with the present invention.
Figure 2:
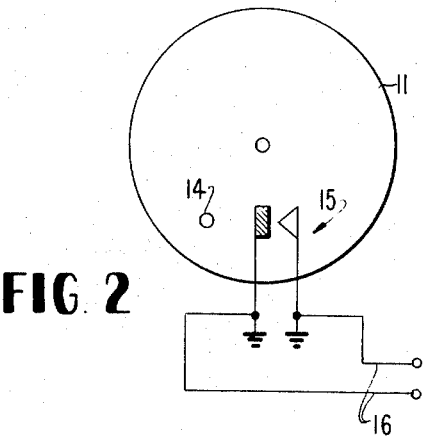
FIGS. 2 and 3 are somewhat schematic views of two different embodiments for the shifting device of the rotary acceleration transmitter in accordance with the present invention.

Referring now to the drawing wherein like reference numerals are used throughout the various views to designate like parts, and more particularly to FIG. 1, reference numeral 10 designates in this Figure the rotating part, for example, the hub of a motor vehicle wheel, within which is rotatably supported a rotating mass 11. The latter is connected with the rotating part 10 by a spring 12, and additionally a conventional damping installation 13 of any known construction acts on the rotating mass 11. An entrainment or follower member 14 is arranged on the rotating mass 11—see FIG. 2 in connection therewith — which cooperates with a switch generally designated by reference numeral 15 that is secured in the rotating part 10. The switch 15 is operatively connected by way of lines 16 with a transmitter or repeater generally designated by reference numeral 17.

The transmitter 17 is a so-called, inductive rotary transmitter of conventional construction and therefore not described in detail herein. A primary winding 19 is secured on the fixed stub shaft 18 of the transmitter 17, and more particularly directly adjacent to a plate 20 which forms part of the iron core for the magnetic field. A sleeve 21 which is U-shaped in cross-section, is secured in the rotating part 10 which forms the other part of the iron core and which forms together with the plate 20 the gap 22. The sleeve 21 accommodates the secondary winding 23 mounted therein which —as already mentioned — is operatively connected with the shifting device 15 by way of leads 16.

If this rotary acceleration transmitter 17 is connected to an alternating current voltage, then one obtains on the primary side of the transmitter 17 a large impedance difference, depending on whether the switch 15 is open or closed. This impedance change can be appropriately utilized for the purpose of influencing a transistorized, high-frequency generator in its oscillating behavior. Such a generator oscillates as long as the load by means of the transmitter is of the high-impedance type, i.e., has a high ohmic value. If the impedance becomes small, then the oscillator stops to oscillate. The high-frequency signals of the generator are rectified so that one receives an unequivocal yes-no signal for a predetermined value of the rotary acceleration; namely, when the entrainment member 14 closes the switch 15.

Figure 3:
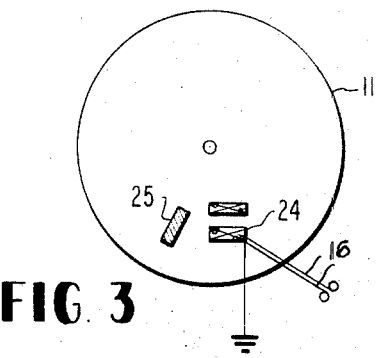

According to FIG. 3, a coil or winding 24 is arranged in or on the rotating part 10 in lieu of the switch 15 which is operatively connected in the described manner by way of leads with the secondary winding 23 of the transmitter 17. A metal plate 25 is disposed on the rotating mass 11 which, in its rest or normal position has a predetermined distance from the coil 24, i.e., represents a predetermined damping for the coil 24. If now a rotary acceleration occurs, then the metal plate 25 more or less, changes its distance from the coil 24, i.e., the damping thereof changes.

Figure 4:
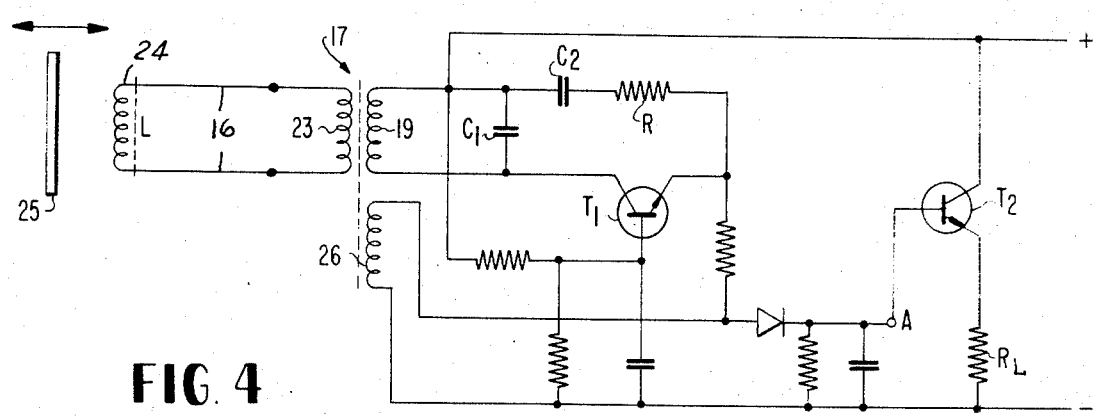
FIG. 4 is a schematic wiring diagram for the installation in accordance with the present invention.

According to FIG. 4, a transistor $T_1$ is operated as oscillator in an oscillator circuit with capacitive feedback. The inductance L transformed by way of the transmitter 17 with its two windings 19 and 23 represents, together with the capacity $C_1$, the tuned circuit of the oscillator. The feedback path is formed by the capacity $C_2$ and the adjustable resistance R. When the metal plate 25 approaches the coil 24, energy is removed from the tuned circuit, i.e., it therefore represents a damping. The degree of positive feedback is adjustable at the resistance R, thus also that distance of the plate 25 from the coil 24 is adjustable within limits at which the circuit no longer oscillates. The additional winding 26 at the fixed part of the transmitter 17 supplies an alternating current voltage which is rectified so that a D. C. voltage is present at the point A of the circuit insofar as the generator oscillates whereas the voltage becomes zero in case of stoppage of the oscillations. A switching transistor $T_2$ can be controlled by this voltage at point A which selectively engages (connects) or disengages (disconnects) a load $R_2$. The circuit is thereby made and connected in such a manner that in the normal position of the metal plate 25 — i.e., relatively close to the winding 24—the oscillator is damped, i.e., no current flows through the load $R_L$. If the plate 25 now increases its distance from the coil 24 as a result of a predetermined rotary acceleration, then the oscillator starts to oscillate and the load $R_L$ will be connected through, i.e., will be supplied with current. This circuit may be varied at will, depending on whether the load $R_L$ is to be engaged or disconnected upon reaching the boundary or limit value. The signal obtained in this manner can be further directly processed electronically. The corresponding boundary value or limit value for the response can be adjusted by means of the resistance R.

The principle of the present invention can also be applied if several different rotary acceleration values have to be determined or detected which may be positive or negative. In such a case, one may operate either with several rotary transmitters or each contact receives a different frequency which is then transmitted by the same rotary transmitter.

While we have shown and described only two embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A pulse transmitter operable to respond when a rotating part exceeds a predetermined acceleration, which comprises a rotary mass coupled with the rotating part by way of a yielding means so that the rotation of the rotary mass with respect to the rotating part serves as indication for the rotary acceleration, and contactless transmitter means including transformer means having primary and secondary windings, one of said windings being secured for rotation in unison with the rotating part and the other winding being mounted on a relatively fixed part, and further means operated by said rotating mass for changing the effective impedance in the circuit of said one winding to thereby produce a signal in a signal producing circuit means connected to the other winding.

2. A pulse transmitter according to claim 1, wherein said further means includes a switch means operable to selectively short-circuit said one winding when the acceleration of the rotating part exceeds the predetermined rotary acceleration.

3. A pulse transmitter according to claim 1, wherein said further means include a further winding connected with said one winding, and means on said rotating mass for changing the effective impedance of said further winding.

4. A pulse transmitter according to claim 1, wherein said signal producing circuit means includes an oscillator means having said other winding in its tuned circuit.

5. A pulse transmitter according to claim 4, wherein said further means includes a switch means operable to selectively short-circuit said one winding when the acceleration of the rotating part exceeds the predetermined rotary acceleration.

6. A pulse transmitter according to claim 4, wherein said further means include a further winding connected with said one winding, and means on said rotating mass for changing the effective impedance of said further winding.

7. A pulse transmitter responding upon exceeding a predetermined rotary acceleration, which includes a rotating system, a rotary mass coupled with the rotating system by way of a spring, whose rotation with respect to a rotating part of the rotating system serves as measurement for the rotary acceleration, characterized by a contactless transmitter means having primary and secondary windings, and shifting means operatively associated with said rotating mass, said shifting means being operatively connected with the secondary winding arranged in the rotating part, while the primary winding is arranged in the fixed part and is operatively connected with means for producing a signal, a coil connected in the circuit of the secondary winding being arranged as shifting means in the rotating part whose A. C. impedance is adapted to be influenced by a metal plate operatively connected with the rotating mass.

8. A pulse transmitter according to claim 7, characterized in that said signal producing means is high-frequency generator.

9. A pulse transmitter according to claim 8, characterized in that the shifting means is a continuously operable shifting means.

10. An impulse transmitter according to claim 7, characterized in that the metal plate increases its distance from the coil during deflection of the rotating mass.

11. An impulse transmitter according to claim 7, characterized in that the metal plate is secured at the rotating mass.

12. An impulse transmitter according to claim 11, characterized in that the metal plate increases its distance from the coil during deflection of the rotating mass.

13. A pulse transmitter responding upon exceeding a predetermined rotary acceleration comprising a rotating system having a rotating part and a fixed part, a rotary mass coupled with the rotating part by way of a spring such that the rotation of said rotary mass with respect to the rotating part of the rotating system serves as measurement for the rotary acceleration, contactless transmitter means having a primary winding arranged on the fixed part and a secondary winding arranged on the rotating part, and shifting means being connected to the secondary winding and being responsive to the rotation of the rotary mass with respect to the rotating part for controlling the secondary winding, the primary winding being directly connected with means for producing a signal and being responsive to the secondary winding for controlling the output signal of said signal producing means.

14. A pulse transmitter according to claim 13, characterized in that the shifting means is a continuously operable shifting means.

15. A pulse transmitter according to claim 13, characterized in that the shifting means is a switch.

16. A pulse transmitter according to claim 13, characterized in that the shifting means includes a coil cooperating with a metal plate.

17. A pulse transmitter according to claim 13, characterized in that the pulse transmitter determines rotary accelerations of a wheel of a motor vehicle 18. A pulse transmitter according to claim 13, characterized in that said signal producing means is a high-frequency generator.

19. A pulse transmitter according to claim 18, characterized in that the high-frequency generator is transistorized.

20. A pulse transmitter according to claim 13, characterized in that a switch connected in the circuit of the secondary winding is arranged as shifting means in the rotating part whose contacts are adapted to be closed by entrainment means operatively connected with the rotating mass.

21. A pulse transmitter according to claim 20, characterized in that the entrainment means is arranged on the rotating mass.

22. A pulse transmitter according to claim 20, characterized in that said signal producing means is a high-frequency generator.

23. A pulse transmitter according to claim 22, characterized in that the shifting means is a continuously operable shifting means.

* * * * *